United States Patent
Maier

(10) Patent No.: US 9,327,763 B2
(45) Date of Patent: May 3, 2016

(54) SAFETY DEVICE ON A VEHICLE, AND ASSOCIATED VEHICLE

(71) Applicant: AUDI AG, Ingolstadt (DE)

(72) Inventor: Hans-Peter Maier, Wolnzach (DE)

(73) Assignee: AUGI AG, Ingolstadt (DE)

( * ) Notice: Subject to any disclaimer, the term of this patent is extended or adjusted under 35 U.S.C. 154(b) by 0 days.

(21) Appl. No.: 14/427,541

(22) PCT Filed: Jun. 5, 2013

(86) PCT No.: PCT/EP2013/001654
§ 371 (c)(1),
(2) Date: Mar. 11, 2015

(87) PCT Pub. No.: WO2014/040663
PCT Pub. Date: Mar. 20, 2014

(65) Prior Publication Data
US 2015/0210315 A1 Jul. 30, 2015

(30) Foreign Application Priority Data
Sep. 12, 2012 (DE) .......................... 10 2012 017 999

(51) Int. Cl.
*B62D 9/00* (2006.01)
*B62D 25/08* (2006.01)
*B62D 21/15* (2006.01)
*B60R 19/14* (2006.01)
(Continued)

(52) U.S. Cl.
CPC . *B62D 9/00* (2013.01); *B60R 19/00* (2013.01); *B60R 19/14* (2013.01); *B60R 19/34* (2013.01); *B62D 21/152* (2013.01); *B62D 25/082* (2013.01)

(58) Field of Classification Search
CPC ...... B62D 9/00; B62D 21/152; B62D 25/082; B60R 19/00; B60R 19/14; B60R 19/34
See application file for complete search history.

(56) References Cited

U.S. PATENT DOCUMENTS 3,499,661 A * 3/1970 Rowe, Jr. ............... B60R 19/285
  105/6
5,911,426 A * 6/1999 Yamamoto ............... B60G 3/04
  180/65.1
(Continued)

FOREIGN PATENT DOCUMENTS

DE 101 13 098 9/2002
DE 102010031089 1/2012
(Continued)

*Primary Examiner* — Faye M Fleming
(74) *Attorney, Agent, or Firm* — Henry M. Feiereisen LLC

(57) ABSTRACT

A safety device on a vehicle includes a cable system provided for each one of front wheels of the vehicle, the cable system including a traction cable fastened on a first fastening point on a component of the vehicle body and on a second fastening point on one of the front wheels, at least one deflector arranged between the first and second fastening points, and a self-inhibiting device which includes a cable slack and a lock, wherein in a deactivated state of the cable system the lock releases the cable slack to permit a steering movement of the front wheel, and in an activated state locks the cable slack so that in case of a frontal collision a penetrating obstacle actuates the traction cable in dependence on an overlap of the frontal collision, thereby pivoting the affected front wheel from a starting position into a protective position in which the front wheel is turned with its outside in the direction of the obstacle and with its inside in the direction of an end wall of the vehicle body.

12 Claims, 2 Drawing Sheets

(51) Int. Cl.
*B60R 19/00* (2006.01)
*B60R 19/34* (2006.01)

(56) References Cited

U.S. PATENT DOCUMENTS

| | | | |
|---|---|---|---|
| 7,819,218 B2 * | 10/2010 | Eichberger | B60R 19/00 180/274 |
| 8,720,980 B2 | 5/2014 | Weigl et al. | |
| 9,120,507 B1 * | 9/2015 | Alwan | B62D 21/152 |
| 9,126,550 B2 * | 9/2015 | Nusier | B62D 21/152 |
| 2001/0024053 A1 | 9/2001 | Takese | |
| 2008/0023954 A1 | 1/2008 | Eichberger | |
| 2012/0267917 A1 | 10/2012 | Weigl et al. | |
| 2013/0328334 A1 * | 12/2013 | Hoiss | B62D 21/152 293/154 |
| 2015/0021936 A1 * | 1/2015 | Nusier | B62D 21/152 293/114 |
| 2015/0084322 A1 * | 3/2015 | Killian | B60B 21/026 280/784 |

FOREIGN PATENT DOCUMENTS

| EP | 1138580 | 3/2001 |
|---|---|---|
| EP | 1748911 | 8/2008 |

\* cited by examiner

SAFETY DEVICE ON A VEHICLE, AND ASSOCIATED VEHICLE

CROSS-REFERENCES TO RELATED APPLICATIONS

This application is the U.S. National Stage of International Application No. PCT/EP2013/001654, filed Jun. 5, 2013, which designated the United States and has been published as International Publication No. WO2014/040663 and which claims the priority of German Patent Application, Ser. No. 10 2012 017 999.5, filed Sep. 12, 2012, pursuant to 35 U.S.C. 119(a)-(d).

BACKGROUND OF THE INVENTION

The invention relates to a safety device on a vehicle and an associated vehicle with such a safety device.

The front end of a vehicle usually has two frontal longitudinal members as crash structures on the free ends of which a cross member is arranged on which a bumper is fastened. In the case of a frontal impact the impact energy is converted into deformation work. The known crash structures of a vehicle are configured with an overlap to the crash partner with 100% or minimally 40%. With these overlaps the occurring forces can for example be absorbed via the bumper and the longitudinal member of the impacted vehicle through deformation of these structures. In the event of an accident with small overlap such as for example 25%, an interaction of the longitudinal member is not possible. Therefore the occurring forces may be conducted past the crash structure via the wheel rim into the foot well of the vehicle. For reducing the entering into the foot well the front wheel can be turned in by appropriate measures in the direction of the obstacle.

EP 1 748 911 B1 discloses a deflector for motor vehicles in the case of partially overlapping frontal collision, whose front has a left-hand and right-hand longitudinal member. The deflector is arranged in front of the front wheel and protects the front wheel in the case of a collision. Hereby the deflector forms a kinematic chain which is situated approximately in the horizontal plane and whose coupler is a deflector, wherein the deflector further has a pivotal pivot arm which is connected on one of its sides with the respective longitudinal member via a bearing and on its other side with the deflector via a joint, wherein in the event of a frontal impact the deflector pivots backwards and is displaced towards the outside of the vehicle so that the deflector engages on the outer vertical boundary surface of a front wheel. In addition a connection means can engage on the deflector, which connection means acts on the track rod of the motor vehicle. The connection means can be a traction cable which displaces the track rod by turning in the respective wheel.

From DE 101 13 098 A1 a safety device on a vehicle for protection of the vehicle occupants in the case of a frontal collision is known which includes means for preventing intrusion of the front wheels through the front wall into the passenger compartment, which front wall delimits the passenger compartment towards the front. These means are formed by the front wheels themselves and a device which interacts with the front wheels, by which device the front wheels can be pivoted out of a normal position into a protective position deviating from the normal position. In the case of a vehicle collision these means cause a pivoting of the front wheels with their insides in the direction towards the front wall in particular so as to assume a snowplow position relative to each other. The device is formed by a drive aggregate which in the case of an impact is moved in the direction of the passenger compartment and a flexible belt pull or traction cable as pulling member for each front wheel, wherein the pulling member is fastened on one of its sides on the steering knuckle of the respective front wheel and on the other side on the front side and region of the longitudinal member which faces away from the respective front wheel and is guided around the drive aggregate on the side that faces the passenger compartment.

SUMMARY OF THE INVENTION

An object of the invention is to provide a safety device on a vehicle and a corresponding vehicle with such a safety device, which enable reducing the consequences of an accident in the case of a frontal impact with small overlap.

According to the invention this object is solved by providing a safety device on a vehicle including a cable system provided for each one of front wheels of the vehicle, the cable system including a traction cable fastened on a first fastening point on a component of the vehicle body and on a second fastening point on one of the front wheels, at least one deflector arranged between the first and second fastening points, and a self-inhibiting device including a cable slack and a lock, wherein in a deactivated state of the cable system the lock releases the cable slack so as to permit a steering movement of the front wheel, and in an activated state of the cable system the lock locks the cable slack so that in case of a frontal collision a penetrating obstacle actuates the traction cable in dependence on an overlap of the frontal collision, thereby pivoting the front wheel affected by the frontal collision from a starting position into a protective position in which the front wheel is turned with its outside in the direction of the obstacle and with its inside in the direction of an end wall of the vehicle body, and by providing a vehicle which includes such a safety device.

Advantageous embodiments and refinements of the invention are set forth in the dependent claims.

The safety device according to the invention on a vehicle includes for each front wheel a cable system with a traction cable which is fastened at a first fastening point on a vehicle body part and on a second fastening point on a front wheel, and at least one deflector arranged between the first and second fastening points. Hereby in a deactivated state the cable system releases a steering movement of the front wheel arranged in a wheel housing and during a collision in an activated state pivots the respective front wheel from a starting position into a protective position in which the front wheel is turned with its outside in the direction of the obstacle and with its inside in the direction of the front wall. In order to provide a safety device on a vehicle and a corresponding vehicle with such a safety device which enable reducing the consequences of an accident in the case of a frontal impact with small overlap, the respective cable system includes according to the invention a self-inhibiting device arranged between the fastening points with a cable slack and a lock. Hereby the lock releases in the deactivated state the cable slack of the pull cable and with this the steering movement of appropriate and in the activated state locks the cable slack of the pull cable so that in the case of a frontal impact the entering object actuates the pull cable in dependence on the overlap, which pull cable pivots the respective front wheel into the protective position. The "oblique position" of the respective front wheel results in a lower risk of intrusion of the front wheel into the foot well in the case of a frontal collision with low overlap.

Embodiments of the safety device according to the invention are capable via the cable system to steer the respective wheel away from the obstacle in the case of a frontal collision with small overlap, which is for example smaller than 25%.

As a result the foot well is additionally protected and the vehicle can be guided away from the collision partner. In the case of a frontal collision with large overlap in which the front wheels are to remain straight, the cable system is not triggered. Thus advantageously the risk of injury to the occupants is reduced in the case of a frontal collision with small overlap without introducing additional stiffening features and/or deflectors in the region of the foot well, which would increase the weight of the vehicle. In the deactivated state the cable system releases the wheel movement. This means that embodiments of the safety device according to the invention do not influence the steering movements of the front wheels during normal operation.

In an advantageous embodiment of the safety device according to the invention the first fastening point can be arranged in the region of an outer front border of the wheel housing so that the first fastening point moves with the entering obstacle in the direction of the respective front wheel when the overlap of the frontal impact falls below a predetermined threshold value. this advantageously ensures that the cable system is only activated in the case of a frontal collision with small overlap.

In a further advantageous embodiment of the safety device according to the invention a first deflector can form a first detection point on a longitudinal structure for the traction cable at essentially the height of the first fastening point of the traction cable. Preferably the first deflector can be arranged on the longitudinal structure so that the first deflection point moves with the intruding obstacle in the longitudinal direction of the vehicle when the overlap of the frontal impact exceeds a predetermined threshold value so that the traction cable is not actuated and the corresponding front wheel remains in the starting position.

In a further advantageous embodiment of the safety device according to the invention a second deflector can form a second detection point on the multitudinous structure for the role at essentially the height of the second fastening point of the traction cable. Preferably the self-inhibiting device is arranged in longitudinal direction of the vehicle between the two deflection points which are arranged on the longitudinal structure. As a result the self-inhibiting device is advantageously also protected from damage in the case of a crash. In addition or as an alternative the self-inhibiting device can be arranged in transverse direction of the vehicle between the first fastening point and the first deflection point and/or between the second fastening point and the second deflection point, in particular the self-inhibiting device can include multiple cable slack and locks.

In a further advantageous embodiment of the safety device according to the invention the predetermined protective position of the respective front wheel of the vehicle can move the vehicle away from the intruding obstacle. This advantageously enables further decreasing the crash energy acting on the passenger compartment because the impact angle and the distance to the intruding obstacle can be changed which allows reducing the forces that act in the direction of the passenger compartment.

The vehicle body part with the first fastening point of the traction cable can for example be configured as cross member and/or bumper mount, and/or as vehicle aggregate. The vehicle body part should preferably configured to be sufficiently stiff so as to be capable of engaging on the obstacle in the case of a collision and to be pushed in the direction of the front wheel. The second fastening point of the traction cable can be arranged on a transverse control arm or on a wheel carrier of the front wheel in order to enable the pivoting of the vehicle wheel into the protective position during the collision.

BRIEF DESCRIPTION OF THE DRAWING

Advantageous embodiments of the invention are shown in the drawing and are described in the following.

It is shown in:

DETAILED DESCRIPTION OF PREFERRED EMBODIMENTS

Figure 1:
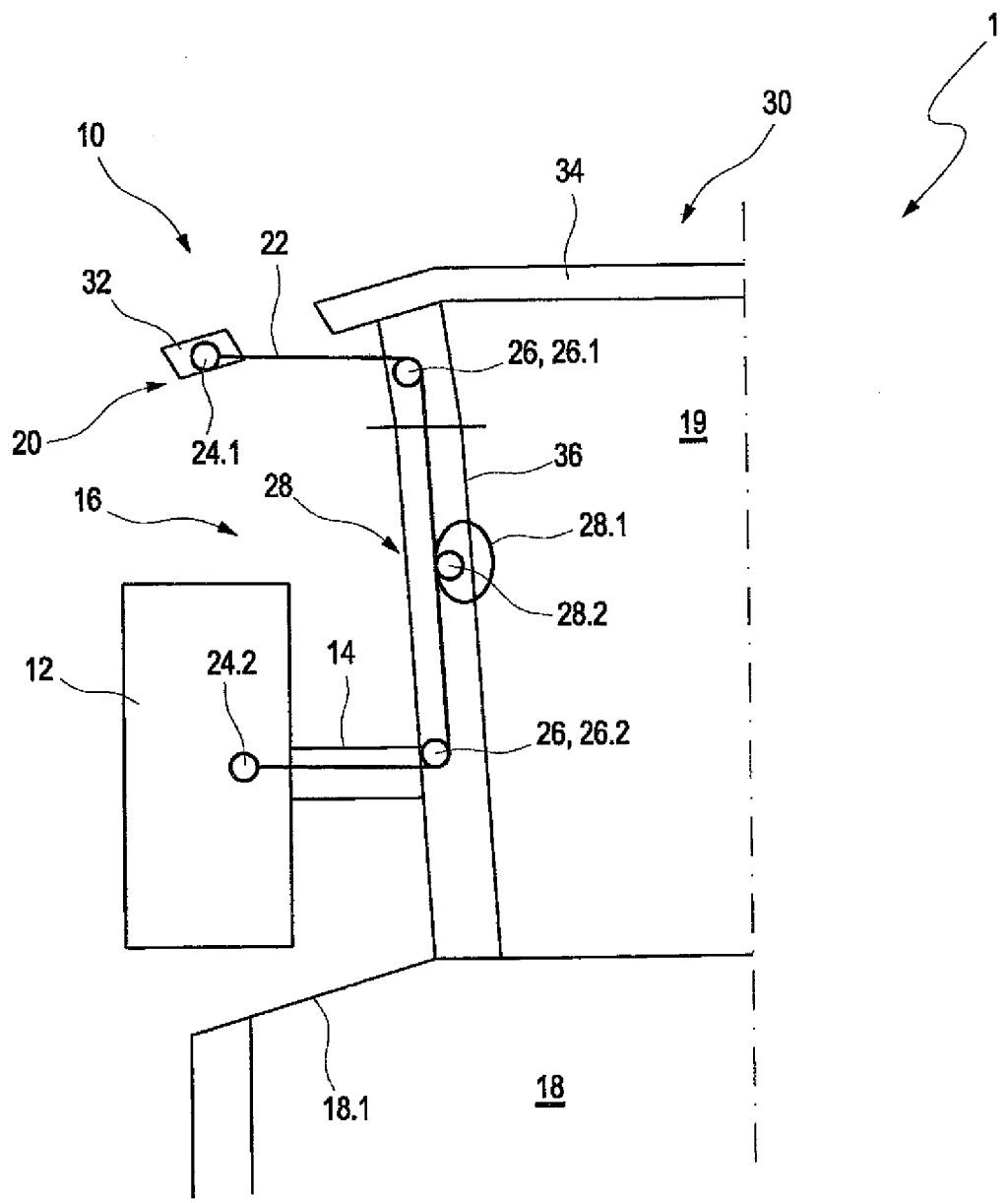
Figure 2:
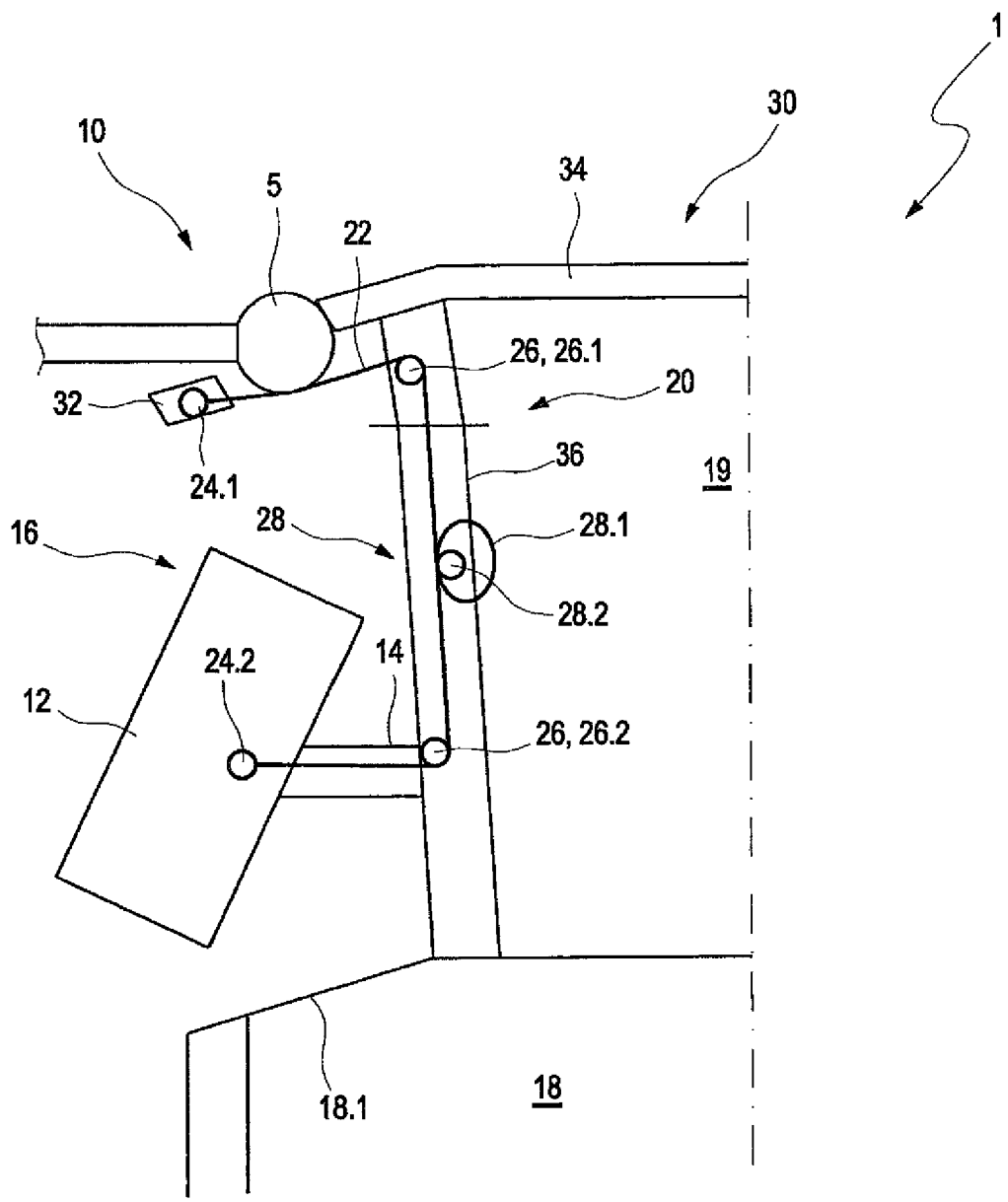

FIG. 1 a schematic top view onto a side of a front end of a vehicle with a first exemplary embodiment of a safety device according to the invention on a vehicle in a deactivated state, and FIG. 2 a schematic top view onto the exemplary embodiment of the safety device according to the invention in a vehicle according to FIG. 1 in an activated state.

As can be seen from FIGS. 1 and 2 the shown exemplary embodiment of a safety device 10 according to the invention on a vehicle 1 includes for each front wheel 12 a cable system 29 with a traction cable 22 which is fastened on a first fastening point 24.1 on a vehicle body part 32 and on a second fastening point 24.2 on a front wheel 12, The front wheel 12 is fastened on an steering knuckle 14. Between the first and the second fastening points 24.1, 24,2 at least one deflector 26 is arranged. Hereby the cable system 20 releases in a deactivated state a steering movement of the front wheel 12, which is arranged in a wheel housing 16, and during a collision in an activated state pivots the respective front wheel 12 from an arbitrary starting position shown in FIG. 1 into a protective position shown in FIG. 2, in which the front wheel 12 is turned in with its outside in the direction toward the obstacle 5 and with its inside in the direction toward the front wall 18.1 which separates a foot well 18 from the wheel housing 16. According to the invention the respective cable system 20 includes a self-inhibiting device 28 with a cable slack 28.1 and a lock 28.2 arranged between the fastening points 24.1, 24.2, wherein the lock 28.2 in the deactivated state releases the cable slack 28.1 of the traction cable 22, and with this the steering movement of the front wheel 12, and in the activated state locks the cable slack 28.1 of the traction cable 22 so that in case of a fontal collision the intruding obstacle 5 actuates the traction cable 22 in dependence on the overlap, with the traction cable 22 moving the respective front wheel 12 into the protective position. The predetermined protective position of the respective front wheel 12 advantageously moves the vehicle 1 away from the entering obstacle.

As can be further seen from FIG. 1, the first fastening point 24.1 is arranged in the region of an outer front border of the wheel housing 16 so that the first fastening point 24.1 moves with the entering obstacle 5 in the direction of the respective front wheel 12 when the overlap of the frontal collision falls below a predetermined threshold value, for example 25%. In addition a first deflector 26 forms a first deflection point 26.1 for the traction cable 22 on a longitudinal structure 36 at essentially the height of the first fastening point 24.1 of the traction cable 22. A second deflector 26 forms a second deflection point 26.2 on the longitudinal structure 36 for the traction cable 22 at essentially the height of the second fastening point 24.2 of the traction cable 22. In the shown exemplary embodiment the longitudinal structure 36 corresponds to a longitudinal member at the free ends of which a cross member 34 is arranged on which a bumper can be fastened. Extending on the other end of the longitudinal member 36 is the front wall 18.1 which separates the foot well 18 or an inner space of the vehicle from the wheel housing 16 or the motor space.

In the shown exemplary embodiment the self-inhibiting device 28 is arranged in longitudinal direction of the vehicle between the two deflection points 26.1, 26.2 arranged on the longitudinal structure 36. In addition or as an alternative the self-inhibiting device 28 can be arranged in transverse direction of the vehicle between the first fastening point 24.1 and the first deflection point 26.1 and/or between the second fastening point 24.2 and the second deflection point 26.2.

As can further be seen from FIG. 1, the first deflector 26 is arranged on the longitudinal structure 36 so that the first deflection point 26.1 moves with the entering obstacle 5 in longitudinal direction of the vehicle when the overlap of the frontal collision exceeds a threshold value of for example 40% so that the traction cable is not actuated and the corresponding front wheel 12 remains in the starting position.

As can be further seen from FIG. 2, in the case of a frontal collision with small overlap, i.e., with an overlap of 25% or less, the vehicle body part 32 on which the first fastening point 24.1 of the traction cable 22 is arranged, is moved in the direction of the front wheel while the position of the first deflection point 26.1 and the second deflection point 26.2 remains unchanged. The traction cable 22 is connected on the first fastening point 24.1 with an appropriate vehicle body part 32 which becomes hooked on the obstacle 5 in the case of a frontal collision with small overlap and is pushed in the direction of the front wheel 12. Via the two deflection points 26.1, 26.2 the traction cable 22 pulls on the second fastening point 24.2 of the traction cable 22 and deflects the front wheel 12 away from the obstacle 5.

In order not to interfere with the steering during normal operation the cable system is equipped with a self-inhibiting device 28 between the fastening points 24.1, 24.2. During driving, the self-inhibiting device 28 enables steering of the vehicle 1 owing to the cable slack 28.1 in the case of slow cable movements. In the case of very fast cable movements in the case of a collision with small overlap the self-inhibiting device 28 blocks the cable slack 28.1 via the lock 28.2 and with this activates the cable system 20. In the case of a collision with greater overlap the first deflection point 26.1 is pushed by the obstacle 5 in longitudinal direction of the vehicle in the direction of the vehicle interior 18 and thereby relaxes the cable system 20 which is thus not activated.

The vehicle body part 32 with the first fastening point 24.1 of the traction cable 2 is configured as stiff structural component, preferably as cross member 34 and/or as bumper mount and/or as vehicle aggregate, for example an additional cooler etc. The vehicle body part 32 should preferably be sufficiently stiff so as to be capable of becoming hooked with the obstacle 5 in the case of a collision and be pushed in the direction toward the front wheel 12. The second fastening point 24.2 of the traction cable is for example arranged on a transverse control arm or on a wheel carrier of the front wheel 12.

What is claimed is:

1. A safety device of a vehicle, comprising:
a cable system provided for each one of the front wheels of the vehicle, said cable system comprising
a traction cable fastened on a first fastening point on a component of the vehicle body and on a second fastening point on one of the front wheels,
at least one deflector arranged between the first and second fastening points, and
a self-inhibiting device comprising a cable slack and a lock, wherein in a deactivated state of the cable system the lock releases the cable slack so as to permit a steering movement of the front wheel, and in an activated state of the cable system the lock locks the cable slack so that in case of a frontal collision a penetrating obstacle actuates the traction cable in dependence on an overlap of the frontal collision, thereby pivoting the front wheel affected by the frontal collision from a starting position into a protective position in which the front wheel is turned with its outside in the direction of the obstacle and with its inside in the direction of an end wall of the vehicle body.

2. The safety device of claim 1, wherein the first fastening point is arranged in a region of an outer front border of a wheel housing so that the first fastening point is moved with the penetrating obstacle in the direction of the front wheel affected by the collision when the overlap of the frontal collision is below a predetermined threshold value.

3. The safety device of claim 1, further comprising a first deflector forming a first deflection point for the traction cable on a longitudinal structure substantially at a height of the first fastening point of the traction cable.

4. The safety device of claim 3, wherein the first deflector is arranged on the longitudinal structure so that the first deflection point moves with the penetrating obstacle in the longitudinal direction of the vehicle when the overlap of the frontal collision exceeds a predetermined threshold value so that the traction cable is not actuated and the front wheel affected by the collision remains in a stating position.

5. The safety device of claim 3, further comprising a second deflector forming a second deflection point for the traction cable on the longitudinal structure substantially at a height of the second fastening point of the traction cable.

6. The safety device of claim 5, wherein the self-inhibiting device is arranged in longitudinal direction of the vehicle between the first and second deflection points.

7. The safety device of claims 5, wherein the self-inhibiting device is arranged in longitudinal direction of the vehicle between the first fastening point and the first deflection point and/or between the second fastening point and the second deflection point.

8. The safety device of claim 1, wherein the protective position of the front wheel causes the vehicle to move away from the penetrating obstacle.

9. The safety device of claim 1, wherein the component of the vehicle body with the first fastening point of the traction cable is configured as a structural part.

10. The safety device of claims 9, wherein the component of the vehicle body with the first fastening point of the traction cable is configured as a cross member and/or bumper mount and/or as vehicle aggregate.

11. The safety device of claims 1, wherein the second fastening point of the traction cable is arranged on a transverse control arm or on a wheel carrier of the front wheel.

12. A vehicle, comprising:
a safety device, said safety device comprising a cable system provided for each one of the front wheels of the vehicle, said cable system comprising
a traction cable fastened on a first fastening point on a component of the vehicle body and on a second fastening point on one of the front wheels,
at least one deflector arranged between the first and second fastening points, and
a self-inhibiting device comprising a cable slack and a lock, wherein in a deactivated state of the cable system the lock releases the cable slack so as to permit a steering movement of the front wheel, and in an activated state of the cable system the lock locks the cable slack so that in case of a frontal collision a penetrating obstacle actuates the traction cable in dependence on an overlap of the frontal collision, thereby pivoting the front wheel affected by the frontal collision from a starting position into a protective position in which the front wheel is turned with its outside in the direction of the obstacle and with its inside in the direction of an end wall of the vehicle body.

\* \* \* \* \*

UNITED STATES PATENT AND TRADEMARK OFFICE
CERTIFICATE OF CORRECTION

PATENT NO. : 9,327,763 B2
APPLICATION NO. : 14/427541
DATED : May 3, 2016
INVENTOR(S) : Hans-Peter Maier It is certified that error appears in the above-identified patent and that said Letters Patent is hereby corrected as shown below:

Title page, in column 1, under Assignee, please correct the assignee's name to read --AUDI AG-- instead of "AUGI AG".

Signed and Sealed this
Twenty-first Day of June, 2016

Michelle K. Lee
*Director of the United States Patent and Trademark Office*